Aug. 16, 1960 J. KLINE 2,949,581

FREQUENCY-STABILIZED OSCILLATOR

Filed May 2, 1957

Jack Kline
*INVENTOR*

United States Patent Office 2,949,581

Patented Aug. 16, 1960

2,949,581

FREQUENCY-STABILIZED OSCILLATOR

Jack Kline, Concord, Mass., assignor to Sanders Associates, Inc., Nashua, N.H., a corporation of Delaware Filed May 2, 1957, Ser. No. 656,576

9 Claims. (Cl. 331—91)

The present invention relates to oscillators. More particularly, the invention relates to the frequency stabilization of multi-frequency mode oscillators such as magnetrons.

A number of high-frequency oscillators and, in particular, magnetron oscillators are so-called multi-frequency mode oscillators. In the case of a magnetron, for example, the anode is conventionally so constructed as to include a plurality of resonant cavities. In practice it is not possible to adequately lock these resonant cavities together in such a manner that only a single resonance exists. A magnetron oscillator may generate a complex signal characterized by a number of frequencies. This problem is well known and a considerable effort has been directed by many groups toward its solution. Introduction of a stabilizing cavity in the oscillator circuit not only does not solve the problem of precluding the generation of extraneous signals, but further complicates it, There have been many other attempts at solution, as discussed in an article entitled "Stabilization of Frequency," by F. F. Rieke, Radiation Laboratory Series, vol. 6, chapter 16, McGraw-Hill, 1948.

In one form of prior art approach, energy is coupled from the magnetron to an independent, isolated, stabilization circuit which operates in such a manner as selectively to load down the oscillator so heavily that substantially no oscillations take place at extraneous frequencies. In such systems the useful load circuit is separate from the stabilization circuit. It is pointed out in the above-referenced article that it would be highly desirable to integrate the stabilization circuit with the useful load circuit. As noted in the above-mentioned article, however, and most particularly on page 634 thereof, no satisfactory way of accomplishing such a desirable result was apparent.

It is, therefore, an object of the invention to provide an improved, frequency-stabilized oscillator having an integrated frequency stabilization and load circuit.

It is also an object of the invention to provide an improved high-frequency oscillator exhibiting a high degree of frequency stability.

A still further object of the invention is to provide an improved frequency-stabilized oscillator tunable over a substantial range of frequencies.

A still further object of the invention is to provide an improved frequency-stabilized oscillator that operates stably over a relatively wide range of conditions.

Yet another object of the invention is to provide an improved frequency-stabilized oscillator with a relatively high efficiency of operation.

In accordance with the invention, there is provided a frequency-stabilized oscillator. A high-frequency generator means is provided for generating a high-frequency signal. The generator is capable of operation at a plurality of signal frequencies, including a desired predetermined frequency, and is adapted for operation coupled to a predetermined impedance. A source of power is provided for energizing the generator means. A load means is included having an impedance so chosen as to damp out oscillation of the generator means. A resonant rejection filter means is tuned to the predeterminetd frequency for rejecting a part of the energy of the desired signal at the predetermined frequency. Coupling means couple the generator means and the load means with the rejection filter means therebetween. There is thus provided the predetermined impedance only for the desired signal frequency and the load impedance for all other frequencies. In this way, a greater transfer of energy from the generator means to the load means takes place at undesired signal frequencies than at the predetermined, desired signal frequency, in order substantially to damp out the undesired signals.

In one form of the invention the rejection filter means is effectively coupled in series with the load means.

In another form of the invention the rejection filter means is effectively coupled in parallel with the load means.

In still another form of the invention a phase shifting means is coupled between the generator means and the filter means to provide a predetermined phase relation therebetween at a predetermined frequency.

For a better understanding of the present invention, together with other and further objects thereof, reference is made to the following description taken in connection with the accompanying drawing and its scope will be pointed out in the appended claims.

Figures 1, 2, 3:
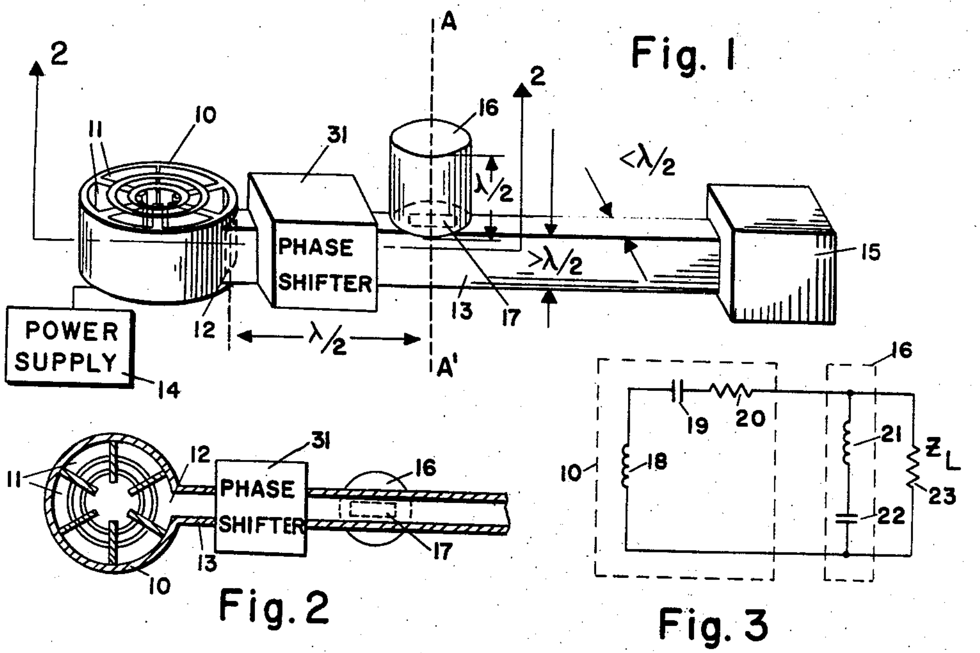
Fig. 1 is a partially schematic, perspective view of a frequency-stabilized oscillator embodying the invention.
Fig. 2 is a sectional, plan view of a portion of the embodiment of Fig. 1 taken along the lines 2—2 of Fig. 1.
Fig. 3 is a schematic, circuit diagram of an equivalent circuit of the oscillator in Fig. 1.

*Description and operation of the frequency-stabilized oscillator in Figs. 1–3*

Referring now to Figs. 1–3, there is illustrated a frequency stabilized oscillator embodying the invention. As shown, an oscillator 10 is coupled through a transmission line 13 to an output load 15. Intermediate the oscillator and the load is coupled a resonant filter 16 and a phase shifter 31 between the oscillator and the filter. In the preferred embodiment, there is shown conventional magnetron oscillator 10, such as a type 4J52, having a plurality of strapped, resonant-cavity anodes 11. The magnetron oscillator 10 provides a resonant oscillating means for generating a high-frequency oscillation, for example, at 10 kilomegacycles. The output of the oscillator 10 is connected at the junction A—A', represented in Fig. 1, through an iris 12 in the magnetron wall coupling to a transmission line 13 comprising, for example, a conventional rectangular, waveguide transmission line of suitable dimensions. A power supply 14 is coupled to the magnetron oscillator 10 to provide a source of power. The power supply 14 may be, for example, a conventional pulse generator which can energize the magnetron oscillator during predetermined time intervals recurring at a predetermined rate, for example 1 microsecond-wide pulses recurring at the rate of 1,000 pulses per second.

The transmission line 13 is terminated in a useful load means 15, such as an antenna. A resonant cavity 16 is coupled to the waveguide transmission line at an intermediate point through a suitable transforming iris window 17. The cavity 16 is, for example, cylindrically shaped, although it may have other configurations such as a sphere. The longitudinal dimension of the cavity 16 is such that it is effectively an integral number of one-half wavelengths long at the operating frequency. However, the length of the cavity 16 may be adjustable to improve the impedance match between the cavity and the line. The diameter of the cavity is preferably one-half wavelength at the design frequency. The iris 17 is designed in a conventional manner to be of suitable dimensions to establish a suitable impedance to effect coupling between the cavity and the transmission line or waveguide 12. The cavity is located an integral number of half wavelengths, normally one, away from the iris 12. While, in theory, the cavity can be located at the junction between the magnetron wall and the transmission line, it is normally physically inconvenient to do so.

As shown in Figs. 1 and 2, a phase shifter 31 may be coupled between the irises 12 and 17 to further adjust the various impedance matches associated with the line 13. The phase shifter may be any of a number of conventional devices such as, for example, a variable dielectric inserted into the guide, a line stretcher, or a ferrite phase shifter.

*Operation*

The operation of the frequency-stabilized oscillator will now be described with reference to Figs. 1, 2 and 3. In Fig. 3 the oscillator 10 is represented by an equivalent circuit of an inductor 18, a capacitor 19 and an internal resistor 20 connected in series to illustrate a series-resonant, constant-current source. It can be shown that a magnetron, for example, provides, within limits, a constant-current source. Given such a constant-current source, it will be apparent that the loading of the oscillator increases as the impedance of the load increases. The cavity 16, in combination with the waveguide 13 and the load 15 provides a series-resonant circuit as indicated by the inductor 21, capacitor 22, and load impedance 23.

The operation is based on the principle that an oscillator does not generate a signal when heavily loaded. The load impedance provides such a loading that when a signal frequency is far from the resonance of the cavity 16, no oscillation can take place because the oscillator is too tightly coupled to the load to permit a build up of oscillations, i.e., the oscillator is too heavily damped. The circuits comprising the inductor 21 and capacitor 22 are chosen to resonate in series at the desired frequency with a high "Q" characteristic, i.e., low internal losses. It will be apparent, therefore, that at this frequency, the impedance presented in series is minimum. At frequencies off resonance and, more particularly, those extraneous or undesired modes characteristic of a magnetron, the impedance presented by the series network is very high. This results in coupling the load impedance 15 very tightly to the oscillator 10 at all frequencies except that of the desired frequency of operation. At the frequency of operation, however, there is a net differential coupling effect which enables the oscillator to generate a signal at a reduced loading relative to the no-stabilization condition. This effect stems from the analysis of "loading" of constant-current generators. For such a generator a short presents minimum loading while an infinite impedance load would, of course, consume infinite power. Here the effect of the series-resonant circuit at resonance is to reduce the effective load impedance and, hence, to reduce the loading. This permits the magnetron 10 to build up oscillations and transmit energy at a desired frequency to the load 15. The phase shifter 31 in the length of the transmission line from the magnetron anode to the cavity provides adjustment if the length is sufficiently great to exhibit variable frequency characteristics over a band of frequencies. To compensate for such phase deviations over the range, the phase may be shifted to provide desired response to a particular operating frequency.

Figure 4:
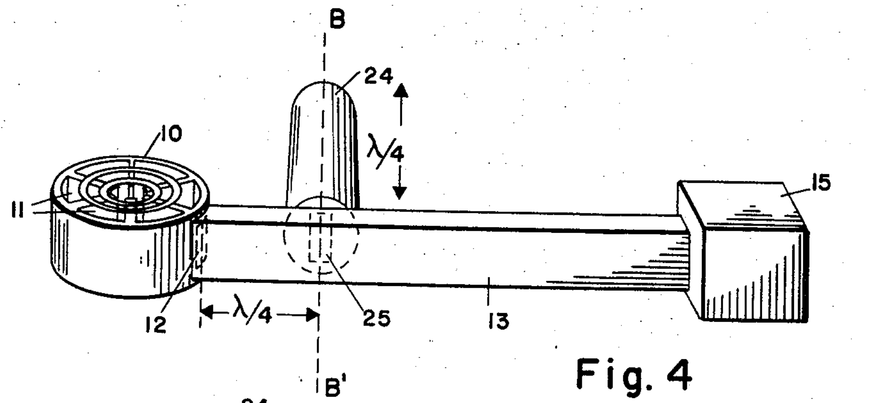
Fig. 4 is a partially schematic, perspective view of a modification of the oscillator in Fig. 1.
Figure 5:
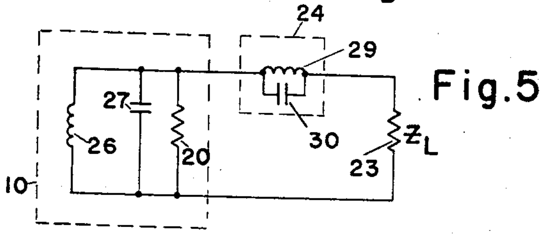
Fig. 5 is a schematic, circuit diagram of an equivalent circuit of the oscillator in Fig. 4.

*Description and operation of the frequency-stabilized oscillator in Figs. 4 and 5*

Referring now to Figs. 4 and 5 there is here illustrated a modification of the oscillator shown in Fig. 1. As shown more particularly in Fig. 5, the oscillator 10 is coupled through the rectangular, waveguide, transmission line 13 to the load 15. A cavity resonator 24 is coupled to the line 13 through an iris window 25 in an end surface and an opening in the wider dimension of the guide. The cavity is preferably located a $\lambda/4$ away from the iris 12 in the oscillator 10. In accordance with the conventional practice this impedance point is reached at an odd integral number of $\lambda/4$'s away. Thus, the cavity 24 and iris 25 may be separated by $\lambda/4$, $3\lambda/4$, $5\lambda/4$ and so forth. The length of the cavity is chosen to be an odd number of $\lambda/4$'s long to provide a high impedance across the iris 25. The length of the cavity may be further modified to match out reactive components presented by the iris 25.

In the equivalent circuit shown in Fig. 5, an inductor 26, capacitor 27 and resistor 28 represent the magnetron as a high impedance, parallel, resonant circuit to provide, in effect, a constant voltage generator. Whether or not the magnetron presents a series resonant impedance circuit with low impedance at resonance or a parallel resonant circuit with high impedance at resonance, corresponding with a constant current or constant voltage generator, respectively, depends upon the point along the transmission line at which the impedance is determined. At the iris 12, for example, the impedance is very low and representable as a series resonant circuit. In accordance with well-known phenomena, at a $\lambda/4$ away from the iris 12 the impedance is transformed into a very high impedance representable by a parallel resonant circuit. The cavity 24 is so located as to provide such a parallel resonant circuit as represented by the inductor 29 and capacitor 30 in Fig. 5. The equivalent circuit for the cavity is shown series-connected between the oscillator 10 and the equivalent load impedance 23. At the resonant or desired signal frequency, the cavity 24 presents a relatively high impedance in series with the load 23. This high impedance, when added to that of the load impedance 23, effectively serves to substantially decouple the load 23 from the oscillator 10 and enable it to generate a high frequency signal at relatively high efficiencies. This is best shown in the well-known phenomenon, noted above, that the loading of a constant voltage generator decreases with an increase in load impedance. Conversely, when the load impedance is decreased, the loading of the constant voltage generator increases, tending to damp out oscillations. The extraneous or undesirable frequency signals developed by the oscillator 10 occur off the resonant frequency of the cavity 24. Since the cavity 24 is preferably extremely high "Q," the impedance presented by it off resonance is tremendously reduced. The load impedance 23 is then tightly coupled to the oscillator 10 to preclude its operation at these undesired frequencies by damping out the extraneous oscillations. The cavity 24 and transmission line 13 thus provide a resonant coupling means which differentially couples the magnetron and the load to provide a greater tendency to transfer energy from the magnetron to the load at undesirable oscillation frequencies than at a predetermined, desired, oscillation frequency. The load is thus tightly coupled to the oscillator 10 only at the undesirable oscillation frequencies to provide a frequency-stabilized oscillator.

The problem of providing a frequency-stabilized, high frequency, tunable oscillator has long plagued the art. It will be apparent that the present invention provides a solution to this problem and greatly advances the art of frequency control.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A frequency-stabilized oscillator, comprising: high-frequency generator means for generating a high-frequency signal, said generator being capable of operation at a plurality of signal frequencies including a desired, predetermined frequency and being adapted for operation coupled to a predetermined impedance; a source of power for energizing said generator means; a load means having an impedance so chosen as to damp out oscillations of said generator means; resonant rejection filter means tuned to said predetermined frequency for rejecting a part of the energy of said desired signal at said predetermined frequency; and coupling means coupling said generator means and said load means with said rejection filter means therebetween to provide said predetermined impedance only for said desired signal frequency and said load impedance for all other frequencies thereby to provide a greater transfer of energy from said generator means to said load means at undesired signal frequencies than at said predetermined desired signal frequency substantially to damp out said undesired signals.

2. A frequency-stabilized oscillator, comprising: high-frequency generator means for generating a high-frequency signal, said generator being capable of operation at a plurality of signal frequencies including a desired, predetermined frequency and being adapted for operation coupled to a predetermined impedance; a source of power for energizing said generator means; a load means having a load impedance for damping out oscillations of said generator means; resonant rejection filter means tuned to said predetermined frequency for rejecting a part of the energy of said desired signal at said predetermined frequency, said filter means being effectively coupled in parallel with said load means; and coupling means coupling said generator means and said load means with said rejection filter means therebetween to provide said predetermined impedance only for said desired signal frequency and said load impedance for all other frequencies thereby to provide a greater transfer of energy from said generator means to said load means at undesired signal frequencies than at said predetermined desired signal frequency substantially to damp out said undesired signals.

3. A frequency-stabilized oscillator, comprising: high-frequency generator means for generating a high-frequency signal, said generator being capable of operation at a plurality of signal frequencies including a desired, predetermined frequency and being adapted for operation coupled to a predetermined impedance; a source of power for energizing said generator means; a load means having a load impedance for damping out oscillations of said generator means; resonant rejection filter means tuned to said predetermined frequency for rejecting a part of the energy of said desired signal at said predetermined frequency, said filter means being effectively coupled in series with said load means; and coupling means coupling said generator means and said load means with said rejection filter means therebetween to provide said predetermined impedance only for said desired signal frequency and said load impedance for all other frequencies thereby to provide a greater transfer of energy from said generator means to said load means at undesired signal frequencies than at said predetermined desired signal frequency to substantially damp out said undesired signals.

4. A frequency-stabilized oscillator, comprising: high-frequency generator means for generating a high-frequency signal, said generator being capable of operation at a plurality of signal frequencies including a desired, predetermined frequency and being adapted for operation coupled to a predetermined impedance; a source of power for energizing said generator means; a load means having a load impedance for damping out oscillations of said generator means; resonant rejection filter means tuned to said predetermined frequency for rejecting a part of the energy of said desired signal at said predetermined frequency; coupling means coupling said generator means and said load means with said rejection filter means therebetween to provide said predetermined impedance only for said desired signal frequency and said load impedance for all other frequencies thereby to provide a greater transfer of energy from said generator means to said load means at undesired signal frequencies than at said predetermined desired signal frequency substantially to damp out said undesired signals; and phase shifting means coupled between said generator means and said filter means to provide a predetermined phase relation therebetween at said predetermined frequency.

5. A frequency-stabilized magnetron oscillator, comprising: a magnetron oscillator for generating a high-frequency signal, said magnetron being capable of operation at a plurality of signal frequencies including a desired, predetermined frequency and being adapted for operation coupled to a predetermined impedance; a source of power for energizing said magnetron; a load means having a load impedance for damping out oscillations of said magnetron; resonant rejection filter means tuned to said predetermined frequency for rejecting a part of the energy of said desired signal at said predetermined frequency; and coupling means coupling said magnetron and said load means with said rejection filter means therebetween to provide said predetermined impedance only for said desired signal frequency and said load impedance for all other frequencies thereby to provide a greater transfer of energy from said magnetron to said load means at undesired signal frequencies than at said predetermined desired signal frequency substantially to damp out said undesired signals.

6. A frequency-stabilized magnetron oscillator, comprising: a magnetron oscillator for generating a high-frequency signal, said magnetron being capable of operation at a plurality of signal frequencies including a desired, predetermined frequency and being adapted for operation coupled to a predetermined impedance; a source of power for energizing said magnetron; a load means having a load impedance for damping out oscillations of said magnetron; a resonant cavity rejection filter tuned to said predetermined frequency for rejecting a part of the energy of said desired signal at said predetermined frequency; and a wave guide transmission line coupling said magnetron and said load means with said cavity therebetween through openings in said cavity and said guide, said cavity being so disposed and said wave guide being of such length as to resonate at said predetermined frequency, to provide said predetermined impedance effectively in series with said load only for said desired signal frequency and said load impedance for all other frequencies, thereby to provide a greater transfer of energy from said magnetron to said load means at undesired signal frequencies than at said predetermined desired signal frequency substantially to damp out said undesired signals.

7. A frequency-stabilized magnetron oscillator, comprising: a magnetron oscillator for generating a high-frequency signal, said magnetron being capable of operation at a plurality of signal frequencies including a desired, predetermined frequency and being adapted for operation coupled to a predetermined impedance; a source of power for energizing said magnetron; a load means having a load impedance for damping out oscillations of said magnetron; a resonant cavity rejection filter tuned to said predetermined frequency for rejecting a part of the energy of said desired signal at said predetermined frequency; and a wave guide transmission line coupling said magnetron and said load means with said cavity therebetween through openings in said cavity and said guide, said cavity being so disposed and said wave guide being of such length as to resonate at said predetermined frequency to provide said predetermined impedance effectively in parallel with said load only for said desired signal frequency and said chosen impedance for all other frequencies thereby to provide a greater transfer of energy from said magnetron to said load means at undesired signal frequencies than at a predetermined desired signal frequency to damp out substantially said undesired signals.

8. A frequency-stabilized magnetron oscillator, comprising: a magnetron oscillator for generating a high-frequency signal, said magnetron being capable of operation at a plurality of signal frequencies including a desired, predetermined frequency and being adapted for operation coupled to a predetermined impedance; a source of power for energizing said magnetron; a load means having a load impedance for damping out oscillations of said magnetron; a cylindrical, resonant cavity rejection filter tuned to said predetermined frequency for rejecting a part of the energy of said desired signal at said predetermined frequency; and a rectangular wave guide transmission line coupling said magnetron and said load means with said cavity therebetween through openings in said cavity and a narrower wall of said guide, said cavity being so disposed and said wave guide being of such length as to resonate at said predetermined frequency to provide said predetermined impedance effectively in series with said load only for said desired signal frequency and said chosen impedance for all other frequencies thereby to provide a greater transfer of energy from said magnetron to said load means at undesired signal frequencies than at a predetermined desired signal frequency to damp out substantially said undesired signals.

9. A frequency-stabilized magnetron oscillator, comprising: a magnetron oscillator for generating a high-frequency signal, said magnetron being capable of operation at a plurality of signal frequencies including a desired, predetermined frequency and being adapted for operation coupled to a predetermined impedance; a source of power for energizing said magnetron; a load means having a load impedance for damping out oscillations of said magnetron; a cylindrical, resonant cavity rejection filter tuned to said predetermined frequency for rejecting a part of the energy of said desired signal at said predetermined frequency; and a rectangular wave guide transmission line coupling said magnetron and said load means with said cavity therebetween through openings in said cavity and a narrower wall of said guide, said cavity being so disposed and said wave guide being of such length as to resonate at said predetermined frequency to provide said predetermined impedance effectively in parallel with said load only for said desired signal frequency and said chosen impedance for all other frequencies thereby to provide a greater transfer of energy from said magnetron to said load means at undesired signal frequencies than at a predetermined desired signal frequency to damp out substantially said undesired signals.

References Cited in the file of this patent

UNITED STATES PATENTS

| | | |
|---|---|---|
| 2,485,029 | Bradley | Oct. 18, 1949 |
| 2,523,841 | Nordsieck | Sept. 26, 1950 |
| 2,632,854 | Altar et al. | Mar. 24, 1953 |
| 2,810,830 | Glass et al. | Oct. 22, 1957 |